United States Patent

Kuribayashi

[11] Patent Number: 5,700,197
[45] Date of Patent: Dec. 23, 1997

[54] FLEXIBLE SHAFT COUPLING HAVING A PLURALITY OF DRIVING SIDE LEAF SPRING MEMBERS, A PLURALITY OF DRIVEN SIDE LEAF SPRING MEMBERS AND ONE RELAY MEMBER

[75] Inventor: Sadatomo Kuribayashi, Tokyo, Japan

[73] Assignee: Kay Seven Co., Ltd., Tokyo, Japan

[21] Appl. No.: 847,285

[22] Filed: Apr. 24, 1997

Related U.S. Application Data

[63] Continuation of Ser. No. 279,567, Jul. 25, 1994, abandoned.

[30] Foreign Application Priority Data

Jul. 28, 1993 [JP] Japan ................................ 5-205726
Oct. 4, 1993 [JP] Japan ................................ 5-269447

[51] Int. Cl.$^6$ ............................................ F16D 3/62
[52] U.S. Cl. ........................ 464/69; 464/81; 464/99; 464/100; 464/147
[58] Field of Search ......................... 464/69, 81, 100, 464/98, 99, 147, 137

[56] References Cited

U.S. PATENT DOCUMENTS

| 1,189,925 | 7/1916 | Dexter | 464/81 X |
| 1,242,906 | 10/1917 | Augustine | 464/69 |
| 1,326,993 | 1/1920 | Thomas | 464/99 |
| 2,146,547 | 2/1939 | Lundgren | 464/81 X |
| 3,242,694 | 3/1966 | Schmidt | 464/147 X |
| 3,791,170 | 2/1974 | Schmidt | 464/69 |
| 4,747,802 | 5/1988 | Hille | 464/99 X |

FOREIGN PATENT DOCUMENTS

| 247231 | 5/1981 | European Pat. Off. . | |
| 34440 | 8/1981 | European Pat. Off. . | |
| 0 034 440 A2 | 8/1981 | European Pat. Off. . | |
| 191552 | 8/1986 | European Pat. Off. . | |
| 0 191 522 A3 | 8/1986 | European Pat. Off. . | |
| 0 247 231 A2 | 12/1987 | European Pat. Off. . | |
| 2425250 | 12/1975 | Germany | 464/69 |
| 404219526 | 8/1992 | Japan | 464/137 |
| WO 81/01317 | 5/1981 | WIPO . | |

*Primary Examiner*—William Stryjewski
*Assistant Examiner*—Emmanuel M. Marcelo
*Attorney, Agent, or Firm*—Kane, Dalsimer, Sullivan, Kurucz, Levy, Eisele and Richard, LLP

[57] ABSTRACT

Leaf spring members (12a through 12d, 14a through 14d, 16a through 16d, 18a through 18d) are disposed on the rear surfaces of a driving side flange portion (2) and a driven side flange portion (4). One end of each leaf spring member taken in a circumferential direction is mounted to the flange portions (2, 4), and the other end is interconnected to the other end of the adjacent leaf spring member. At positions of the flange portions (2, 4) which correspond to a portion for interconnecting these leaf springs, hole portions (7a through 7d, 9a through 9d) are provided, the hole portions (7a through 7d) and the hole portions (9a through 9d) being each disposed at the corresponding position. Torque transmitting rods (10a through 10d) are disposed passing with an allowance through the corresponding hole portions, and to both ends of the torque transmitting rods, interconnecting portions of the leaf spring members of the driving and driven side are each mounted.

5 Claims, 9 Drawing Sheets

FLEXIBLE SHAFT COUPLING HAVING A PLURALITY OF DRIVING SIDE LEAF SPRING MEMBERS, A PLURALITY OF DRIVEN SIDE LEAF SPRING MEMBERS AND ONE RELAY MEMBER

This application is a continuation of application Ser. No. 08/279,567 filed on Jul. 25, 1994, now abandoned.

FIELD OF THE INVENTION

The present invention relates to a shaft coupling and, in particular, to a compact flexible shaft coupling which is easy of assembly and repair.

BACKGROUND OF THE INVENTION

In various mechanisms for transmitting a rotational torque, end portions of two rotational shafts are connected by means of a coupling. For example, an output rotational shaft of an engine or motor and an input rotational shaft of a pump are interconnected by means of the coupling. In this case, it calls for a considerable effort to install the engine or motor and the pump carefully so that the output rotational shaft of the engine or motor and the input rotational shaft of the pump may perfectly align with each other. Further, even if in that installation ample attention is paid to such an alignment, some eccentricity or angular deviation remains between both rotational shafts, and further, since vibrations occur in the engine, motor or pump during operation, in order to absorb these by means of the coupling portion, a flexible shaft coupling using flexible members such as springs, rubber pieces or the like has conventionally been used.

SUMMARY OF THE INVENTION

An object of the present invention is to provide a shaft coupling which is easy to assemble and to repair. Another object of the present invention is to provide a compact shaft coupling. A still another object of the present invention is to provide a shaft coupling which allows the torque to be smoothly transmitted without great vibrations being transmitted. A still further object of the present invention is to provide a shaft coupling which may effectively cope with the eccentricity, angular deviation and the axial displacement between the driving shaft side and the driven shaft side.

According to the present invention, in order to achieve the foregoing end, there is provided a shaft coupling in which:

a driving side flange portion and a driven side flange portion are opposed to each other;

a plurality of driving side leaf spring members are circumferentially disposed on a rear surface of the driving side flange portion, the rear surface of the driving side flange portion being positioned opposite to a front surface of the driving side flange portion which faces the driven side flange portion, one end of each of the driving side leaf spring members taken in the circumferential direction being mounted at the driving side flange portion, the other end of each of the driving side leaf spring members taken in the circumferential direction being connected to the other end of the adjacent driving side leaf spring member taken in the circumferential direction, a plurality of hole portions or notched portions which pass through in an axial direction being provided at the position of the driving side flange portion which corresponds to an interconnecting portion of the driving side leaf spring members;

a plurality of driven side leaf spring members are circumferentially disposed on a rear surface of the driven side flange portion, the rear surface of the driven side flange portion being positioned opposite to a front surface of the driven side flange portion which faces the driving side flange portion, one end of each of the driven side leaf spring members taken in the circumferential direction being mounted at the driven side flange portion, the other end of each of the driven side leaf spring members taken in the circumferential direction being connected to the other end of the adjacent driven side leaf spring member taken in the circumferential direction, a plurality of hole portions or notched portions which pass through in an axial direction being provided at the position of the driven side flange portion which corresponds to an interconnecting portion of the driven side leaf spring members;

the hole portions or notched portions of the driving side flange portion and the hole portions or notched portions of the driven side flange portion being each disposed at the corresponding positions, a plurality of torque transmitting rods being disposed, each of which axially passes with an allowance through the corresponding hole portions or notched portions of the driving side and driven side flange portions, said interconnecting portion of the driving side leaf spring members being mounted to one end of each of the torque transmitting rods, the interconnecting portion of the driven side leaf spring members being mounted to the other end thereof.

Further, according to the present invention, in order to achieve the foregoing end, there is provided a shaft coupling in which:

a driving side flange portion and a driven side flange portion are opposed to each other, a relay member being provided for relaying torque from the driving side flange portion to the driven side flange portion;

a driving side leaf spring member is mounted on a rear surface of the driving side flange portion at a first position taken in the circumferential direction, the rear surface of the driving side flange portion being positioned opposite to a front surface of the driving side flange portion which faces the driven side flange portion, the driving side leaf spring member being connected to the relay member at a second position taken in the circumferential direction, the second position being different from the first position;

a driven side leaf spring member is mounted on a rear surface of the driven side flange portion at a third position taken in the circumferential direction, the rear surface of the driven side flange portion being positioned opposite to a front surface of the driven side flange portion which faces the driving side flange portion, the driven side leaf spring member being connected to the relay member at a fourth position taken in the circumferential direction, the fourth position being different from the third position.

According to the present invention, a shaft coupling can be provided which is easy of assemble and repair, and a compact coupling can be provided. Further, according to the present invention, a shaft coupling which is small in vibrations while torque is being transmitted and which can smoothly transmit the torque can be provided, and a shaft coupling which can effectively cope with the eccentricity, angular deviation and the axial displacement between the driving shaft and the driven shaft can be provided.

Further, according to the present invention, since the relay member is interposed, a shaft coupling having a sufficient torsional rigidity can be obtained.

DESCRIPTION OF THE PREFERRED EMBODIMENTS

Several specific embodiments according to the present invention are described with reference to the accompanying drawings.

Figure 1:
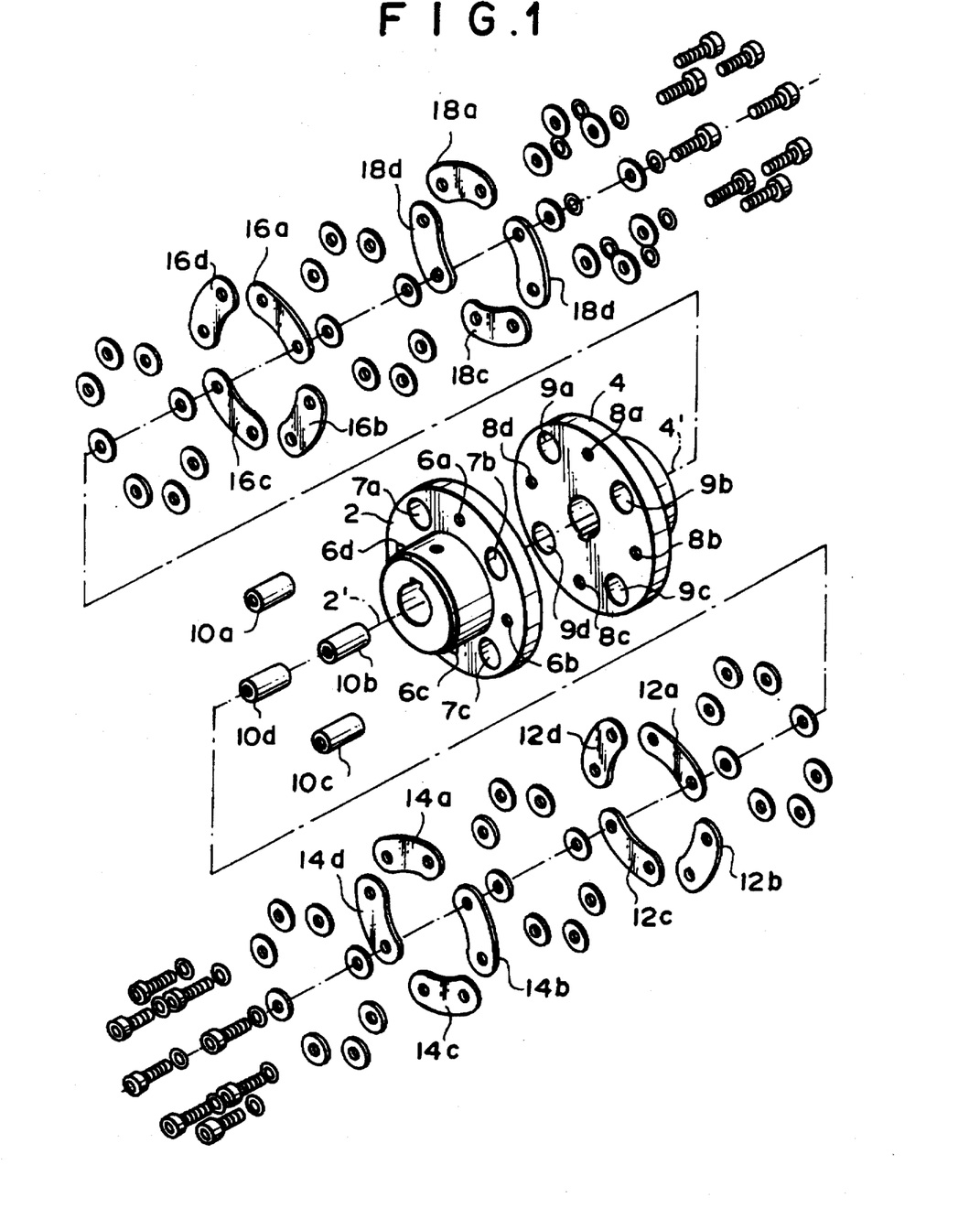
FIG. 1 is an exploded perspective view illustrating a first embodiment of a shaft coupling according to the present invention.
Figure 2:
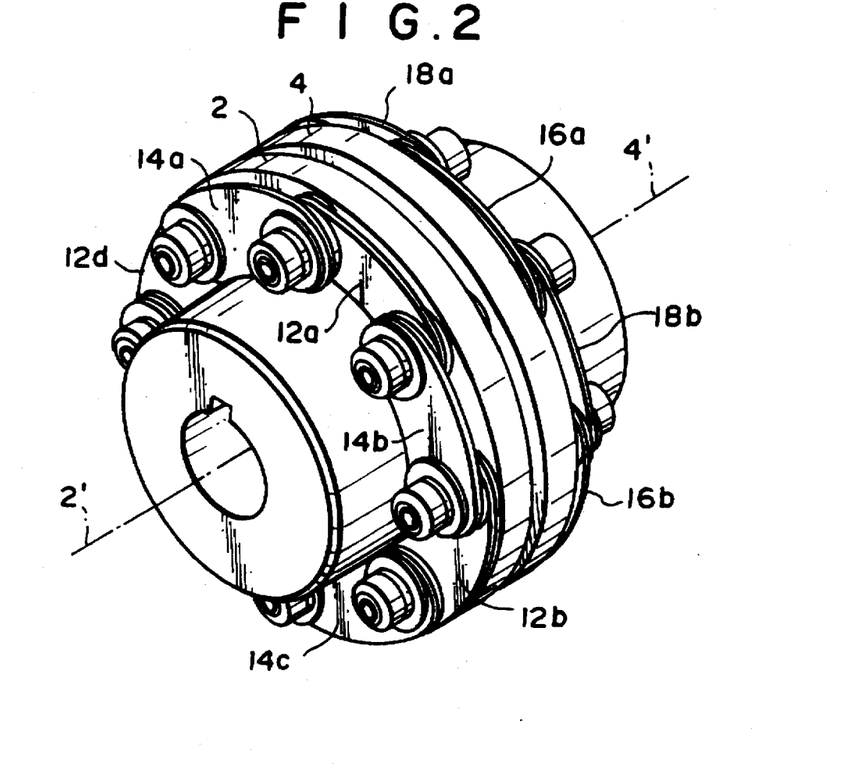
FIG. 2 is a perspective view of the shaft coupling of FIG. 1 which is in the assembled condition.
Figure 3:
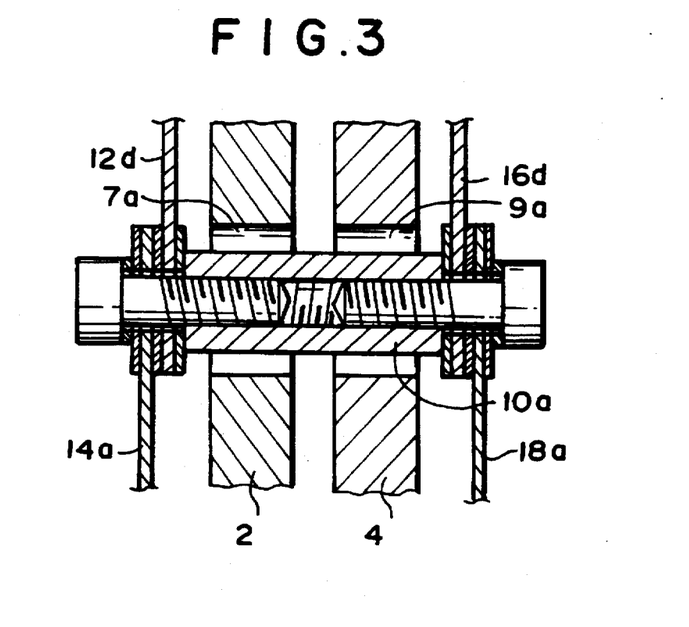
FIG. 3 is a partial cross-sectional view of the shaft coupling of FIG. 1.

FIG. 1 is an exploded perspective view illustrating a first embodiment of a shaft coupling according to the present invention, FIG. 2 is a perspective view of the same in the assembled condition and FIG. 3 is a partial cross-sectional view of the same. In these figures, reference numeral 2 denotes a flange portion at the side of the driving shaft, i.e. driving side flange portion, which is keyed to an end portion of the driving shaft (not shown). 2' denotes a rotational axis of the driving shaft. 4 denotes a flange portion at the side of the driven shaft, i.e. driven side flange portion, which is keyed to an end portion of the driven shaft (not shown). 4' denotes a rotational axis of the driven shaft. The rotational axis 2' of the driving shaft and the rotational axis 4' of the driven shaft substantially align with each other. In consequence, the end surface (front surface) of the driving side flange portion 2 which faces the driven side flange portion 4 and the end surface (front surface) of the driven side flange portion 4 which faces the driving side flange portion 2 run in substantially parallel to each other.

Through the driving side flange portion 2, four axially threaded holes 6a, 6b, 6c, 6d, which are each disposed evenly in the circumferential direction, and four axial hole portions 7a, 7b, 7c, 7d (not shown) disposed evenly in the circumferential direction are formed. The positions of these eight threaded holes or hole portions are allocated evenly in the circumferential direction. Similarly, through the driven side flange portion 4, four axially threaded holes 8a, 8b, 8c, 8d disposed evenly in the circumferential direction and four axial hole portions 9a, 9b, 9c, 9d disposed evenly in the circumferential direction are formed. The positions of these eight threaded holes or hole portions are evenly disposed in the circumferential direction. Further, four axially threaded holes 6a, 6b, 6c, 6d of the driving side flange portion 2 and four axially threaded holes 8a, 8b, 8c, 8d of the driven side flange portion 4 are each positioned axially corresponding to each other, and four axial hole portions 7a, 7b, 7c, 7d of the driving side flange portion 2 and four axial hole portions 9a, 9b, 9c, 9d of the driven side flange portion 4 are each positioned axially corresponding to each other.

Torque transmitting rods 10a, 10b, 10c, 10d are each disposed to pass through each of the axial hole portions 7a, 7b, 7c, 7d of the driving side flange portion 2 and each of the corresponding axial hole portions 9a, 9b, 9c, 9d of the driven side flange portion 4. Through the foregoing rods, threaded holes are each formed passing through axially.

On a rear surface of the driving side flange portion 2, eight arcuate driving side leaf spring members 12a, 12b, 12c, 12d, 14a, 14b, 14c, 14d are circumferentially disposed. These leaf spring members each have a hole at their each end, and adjacent ones are overlapped at the end portions so that the holes align with each other. The hole at one end of each leaf spring member is positioned at the position of the driving side flange portion 2 which corresponds to the axial threaded hole and, by screwing a bolt into the threaded hole, the leaf spring member is mounted to the driving side flange portion 2. Further, the hole of the other end of each leaf member is positioned at a position corresponding to the rod together with the hole of the other end of the adjacent leaf spring member, and by screwing a bolt into the threaded hole of the rod, the leaf spring member is mounted at the end portion of the driving side of the rod. As shown, when they are mounted, a washer is interleaved therebetween.

On a rear surface of the driven side flange portion 4, eight arcuate driven side leaf spring members 16a, 16b, 16c, 16d, 18a, 18b, 18c, 18d are circumferentially disposed. These driven side leaf spring members are also mounted to the driven side flange portion 4 and the torque transmitting rod, as in the driving side leaf spring members.

FIG. 3 illustrates how each member is mounted in the neighborhood of the rod 10a. As shown, the rod 10a has an outer diameter smaller than the inner diameter of the hole portions 7a, 9a through which the rod passes, and has a length greater than the interval between the rear surfaces of the driving side flange portion 2 and driven side flange portion 4. The same is also the case with other rods.

The shaft coupling according to this embodiment may be readily made by assembling the members, as illustrated in FIG. 1.

Incidentally, as the leaf spring member, one comprising a single leaf spring may be used, or ones comprising a plurality of leaf springs laminated together may be used. Further, depending on the magnitude of the torque to be transmitted, as the leaf spring member, ones made of a reinforced plastic, which is favorable for lightening weight, may be used other than one made of metal.

In this embodiment, when the driving side flange portion 2 is rotated, torque is transmitted through the leaf spring members 12a through 12d, 14a through 14d to the rods 10a through 10d, from which it is transmitted through the leaf spring members 16a through 16d, 18a through 18d to the driven side flange portion 4.

Based on the deformations such as bend or twist of each spring member, the following relative movements each becomes possible between the driving side flange portion 2 and the driven side flange portion 4 within an appropriate range:

1. rotation around the axial direction;
2. axial movement;
3. movement within a plane intersecting at a right angle with the axial direction; and
4. rotation which tilts the rotational axis 2' of the driving shaft relative to the rotational axis 4' of the driven shaft.

Thus, by suppressing transmission of vibration between the driving side flange portion 2 and the driven side flange portion 4, the torque can be smoothly transmitted and, even if the eccentricity, angular deviation or axial displacement takes place between the sides of the driving shaft and the driven shaft, they can be absorbed.

Incidentally, the interval between the driving side flange portion 2 and the driven side flange portion 4 is set so as not to prevent the foregoing relative movements between the driving side flange portion 2 and the driven side flange portion 4, which is expected to occur during the operation.

Further, the size of each axial hole portion 7a, 7b, 7c, 7d of the driving side flange portion 2 and the size of each axial hole portion 9a, 9b, 9c, 9d of the driven side flange portion 4 are each set with an allowance so as not to prevent the foregoing relative movements between the driving side flange portion 2 and the driven side flange portion 4, which is anticipated to occur during the operation. In place of the hole portion, a notched portion notched outwardly of the flange portion may also be formed.

In the forgoing embodiment, since only one type of the leaf spring members 12a through 12d, 14a through 14d, 16a through 16d, 18a through 18d may be used, the number of types of the components may be small. If either one of the leaf spring members or the torque transmitting rods is damaged, it is easy to replace by extracting the bolt at the corresponding part and the repair is simple.

Further, in the foregoing embodiment, since the leaf spring member is mounted on the rear surface of the driving side flange portion 2 and the driven side flange portion 4, the axial dimension can be made smaller for compactness by making the front surface of the driving side flange portion 2 and the front surface of the driven side flange portion 4 sufficiently close.

Figure 4:
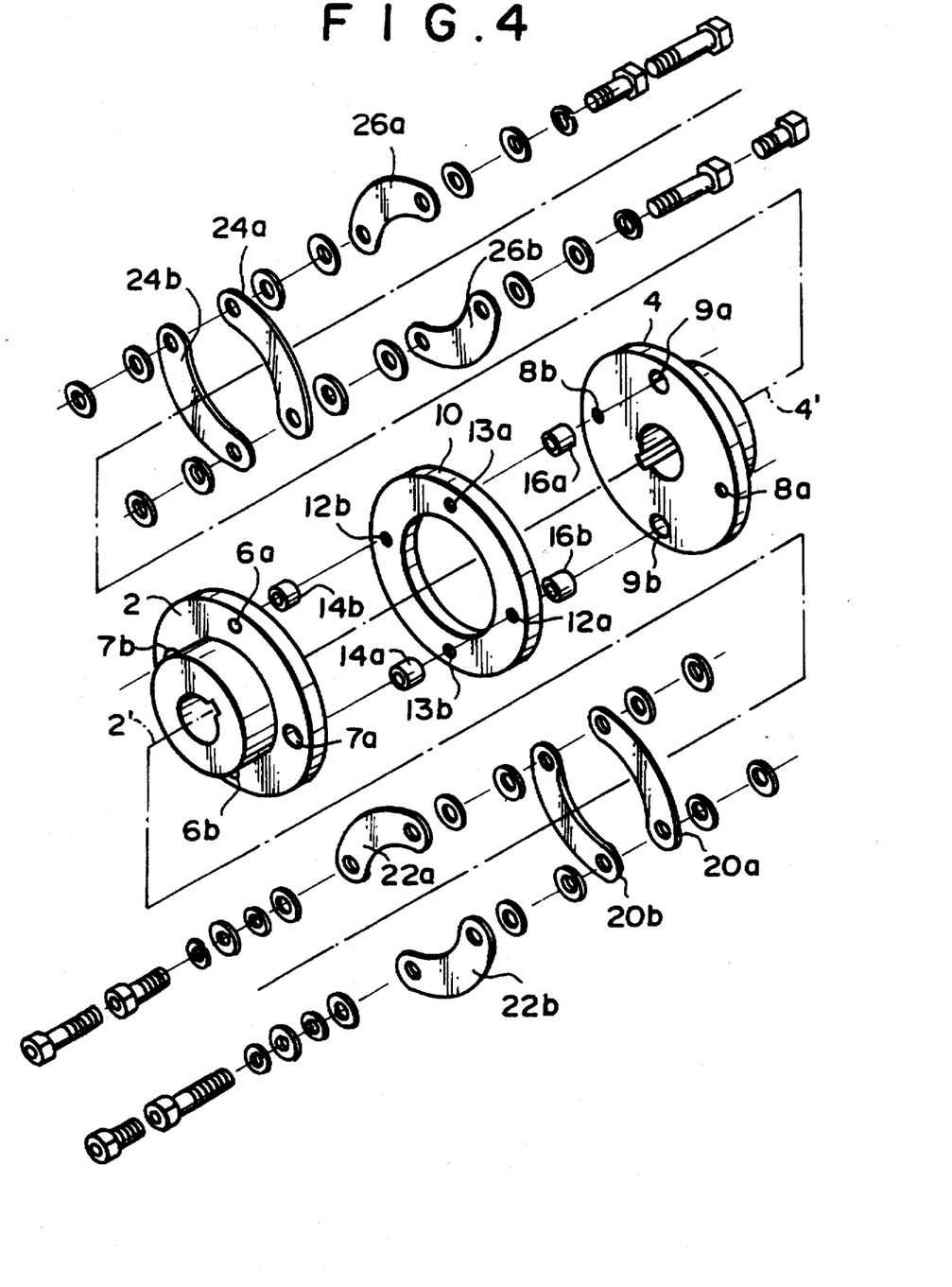
FIG. 4 is an exploded perspective view illustrating a second embodiment of the shaft coupling according to the present invention.
Figure 5:
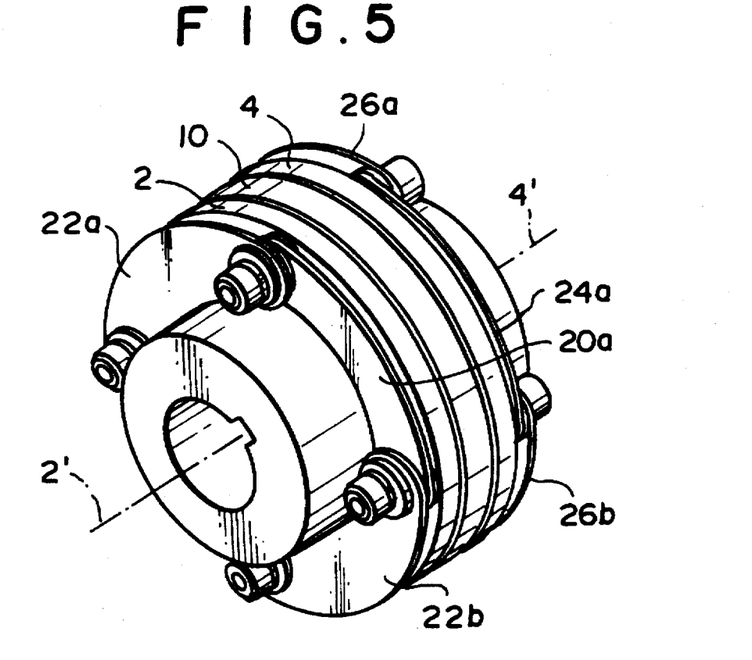
FIG. 5 is a perspective view of the shaft coupling of FIG. 4 which is in the assembled condition.
Figure 6:
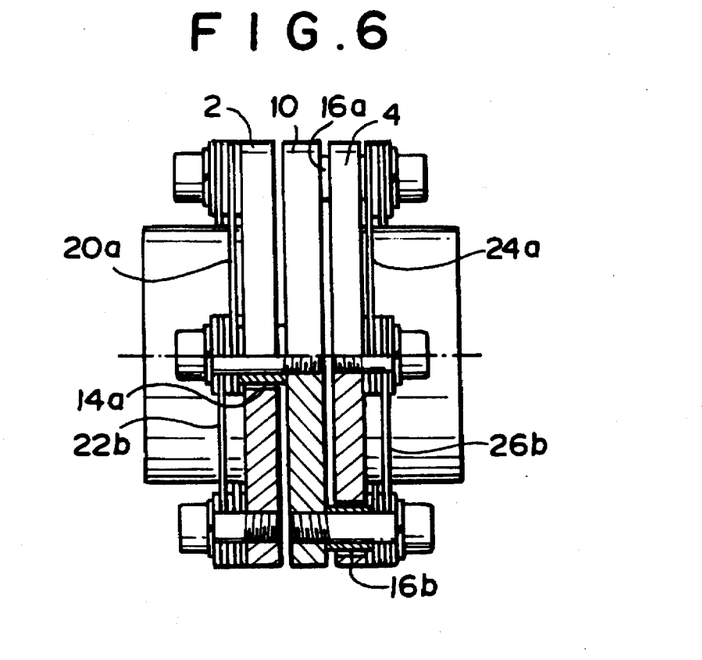
FIG. 6 is a partial cross-sectional, lateral view of the shaft coupling of FIG. 4 which is in the assembled condition.

FIG. 4 is an exploded perspective view illustrating a second embodiment of the shaft coupling according to the present invention, FIG. 5 is a perspective view of the same which is in the assembled condition, and FIG. 6 is a partial cross-sectional lateral view of the same. In these figures, 2 denotes a driving side flange portion, which is mounted with key to the end portion of the driving shaft (not shown). 2' denotes a rotational axis of the driving shaft. 4 denotes a driven side flange portion, which is mounted with key to the end portion of the driven shaft (not shown). 4' denotes a rotational axis of the driven shaft. The rotational axis 2' of the driving shaft and the rotational axis 4' of the driven shaft are in substantial alignment with each other. Therefore, the end surface (front surface) of the driving side flange portion 2 which faces the driven side flange portion 4 and the end surface (front surface) of the driven side flange portion 4 which faces the driving side flange portion 2 run in substantially parallel to each other.

At the driving side flange portion 2, two axially threaded holes 6a, 6b disposed evenly in the circumferential direction and two axial hole portions 7a, 7b disposed evenly in the circumferential direction are formed. The positions of these four threaded holes or hole portions are evenly allocated in the circumferential direction. Similarly, the driven side flange portion 4 is formed with two axially threaded holes 8a, 8b which are evenly disposed in the circumferential direction and two axial hole portions 9a, 9b which are evenly disposed in the circumferential direction. The positions of these threaded holes and hole portions are evenly allocated in the circumferential direction. Two axially threaded holes 6a, 6b of the driving side flange portion 2 and two axial hole portions 9a, 9b of the driven side flange portion 4 are each positioned in axially corresponding manner, and, two axial hole portions 7a, 7b of the driving side flange portion 2 and two axially threaded holes 8a, 8b of the driven side flange portion 4 are each positioned in axially corresponding manner.

Between the driving side flange portion 2 and the driven side flange portion 4, a relay member 10 is disposed which functions to relay the torque transmission from the driving side flange portion 2 to the driven side flange portion 4. The relay member is ring-shaped, and two threaded holes 12a, 12b are each provided at the positions each corresponding to the two axial hole portions 7a, 7b of the driving side flange portion 2, and threaded holes 13a, 13b are each provided at the positions each corresponding to the two axial hole portions 9a, 9b of the foregoing driven side flange portion 4.

Cylindrical spacers 14a, 14b are disposed axially passing with an allowance through the axial hole portions 7a, 7b of the driving side flange portion 2. Cylindrical spacers 16a, 16b are disposed axially passing with an allowance through the axial hole portions 9a, 9b of the driven side flange portion 4.

On a rear surface of the driving side flange portion 2, four arcuate driving side leaf spring members 20a, 20b, 22a, 22b are circumferentially disposed. These leaf spring members each have a hole at their each end, and adjacent ones are overlapped at end portions so that the holes align with each other. The hole of one end of each leaf spring member is disposed at the position corresponding to the axially threaded hole of the foregoing driving side flange portion, and by screwing the bolt into the threaded hole, the leaf spring member is mounted to the driving side flange portion 2. Further, the hole at the other end of each leaf spring member is positioned together with the hole of the other end of the adjacent leaf spring member at the position corresponding to the cylindrical spacer and, by screwing the bolt through a hole of the spacer into the corresponding threaded hole of the relay member 10, the leaf spring member is mounted to the relay member 10. As illustrated, when they are mounted, a washer is interleaved therebetween.

On a rear surface of the driven side flange portion 4, four arcuate driven side leaf spring members 24a, 24b, 26a, 26b are disposed circumferentially. These driven side leaf spring members are also mounted to the driven side flange portion 4 and the relay member 10, as in the driving side leaf spring member.

The shaft coupling according to this embodiment can readily be made by assembling the components as shown in FIG. 4.

Incidentally, as the leaf spring member, ones comprising a single leaf spring may be used, or ones comprising a plurality of springs laminated together may be used. Further, depending on the magnitude of the torque to be transmitted, as the leaf spring member, other than ones made of metal, ones made of a reinforced plastic, which is favorable for lightening weight, may also be used.

In this embodiment, when the driving side flange portion 2 is rotated, the torque is transmitted through the leaf spring members 20a, 20b, 22a, 22b to the relay member 10, from which it is transmitted through the leaf spring members 24a, 24b, 26a, 26b to the driven side flange portion 4.

Based on the deformation such as bending or torsion of each spring member, the following relative movements becomes possible between the driving side flange portion 2 and the driven side flange portion 4 within an appropriate range:

1. rotation around the axial direction;
2. axial movement;
3. movement in a plane intersecting at a right angle with the axial direction; and
4. rotation which tilts the rotational axis 2' of the driving shaft relative to the rotational axis 4' of the driven shaft.

Thus, by suppressing the transmission of vibration between the driving side flange portion 2 and the driven side flange portion 4, the torque can smoothly be transmitted and, even if the eccentricity, angular deviation or axial displacement takes place between the driving side and the driven side, they can be absorbed.

Incidentally, the interval between the driving side flange portion 2 and the driven side flange portion 4 is set so as not to prevent the foregoing relative movements between the driving side flange portion 2 and the driven side flange portion 4, which is expected to occur during the operation.

Further, the size of each axial hole portion 7a, 7b of the driving side flange portion 2 and the size of each axial hole portion 9a, 9b of the driven side flange portion 4 are each set with an allowance so as not to prevent the foregoing relative movements between the driving side flange portion 2 and the driven side flange portion 4, which is anticipated to occur during the operation. In place of the hole portion, a notched portion notched outwardly of the flange portion may be formed.

In the foregoing embodiment, since the relay member 10 is used, the torsional rigidity can sufficiently be increased.

Further, in the foregoing embodiment, since as the leaf spring members 20a, 20b, 22a, 22b, 24a, 24b, 26a, 26b ones of the same configuration may be used, the number of types of components may be smaller. If one of the leaf spring members is damaged, it may readily be replaced by letting the bolt at the corresponding portion off, and the repair is simple.

Further, in the foregoing embodiment, since the leaf spring member is mounted on the rear surface of the driving side flange portion 2 and the driven side flange portion 4, the axial dimension can be made smaller by making the front surface of the driving side flange portion 2 and the front surface of the driven side flange portion 4 sufficiently close up to a minimum distance, and a compaction becomes possible with maintaining a sufficient flexibility.

Figure 7:
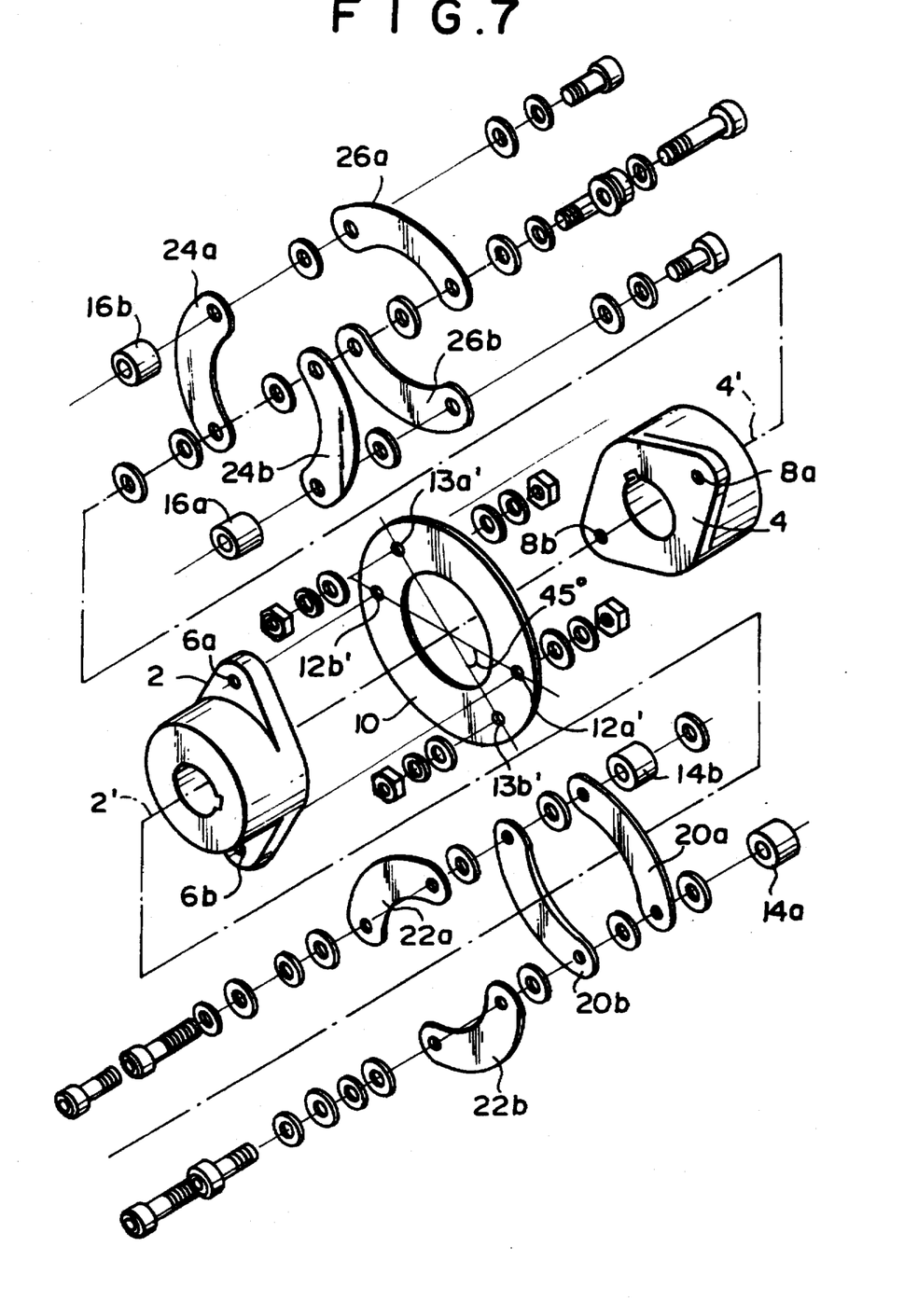
FIG. 7 is an exploded perspective view illustrating a third embodiment of the shaft coupling according to the present invention.

FIG. 7 is an exploded perspective view illustrating a third embodiment of the Shaft coupling according to the present invention, in which like signs are each assigned to the members or portions having a like function as in FIGS. 4 through 6.

In this embodiment, the configurations of the driving side flange portion 2 and the driven side flange portion 4 differ from those of the foregoing second embodiment, and lack the axial hole portions of the flange portion as in the foregoing embodiment. Further, the relay member 10 is formed with mere holes 12a', 12b', 13a', 13b' instead of the threaded holes. The bolt passing through these holes fits with the nut. As illustrated, the angle at which the line interconnecting the center of the hole 12a' and the center of the hole 12b' forms relative to the line interconnecting the center of the hole 13a' and the center of the hole 13b' equals 45 degrees.

Also in this embodiment, a similar effect as in the foregoing second embodiment can be obtained.

Figure 8:
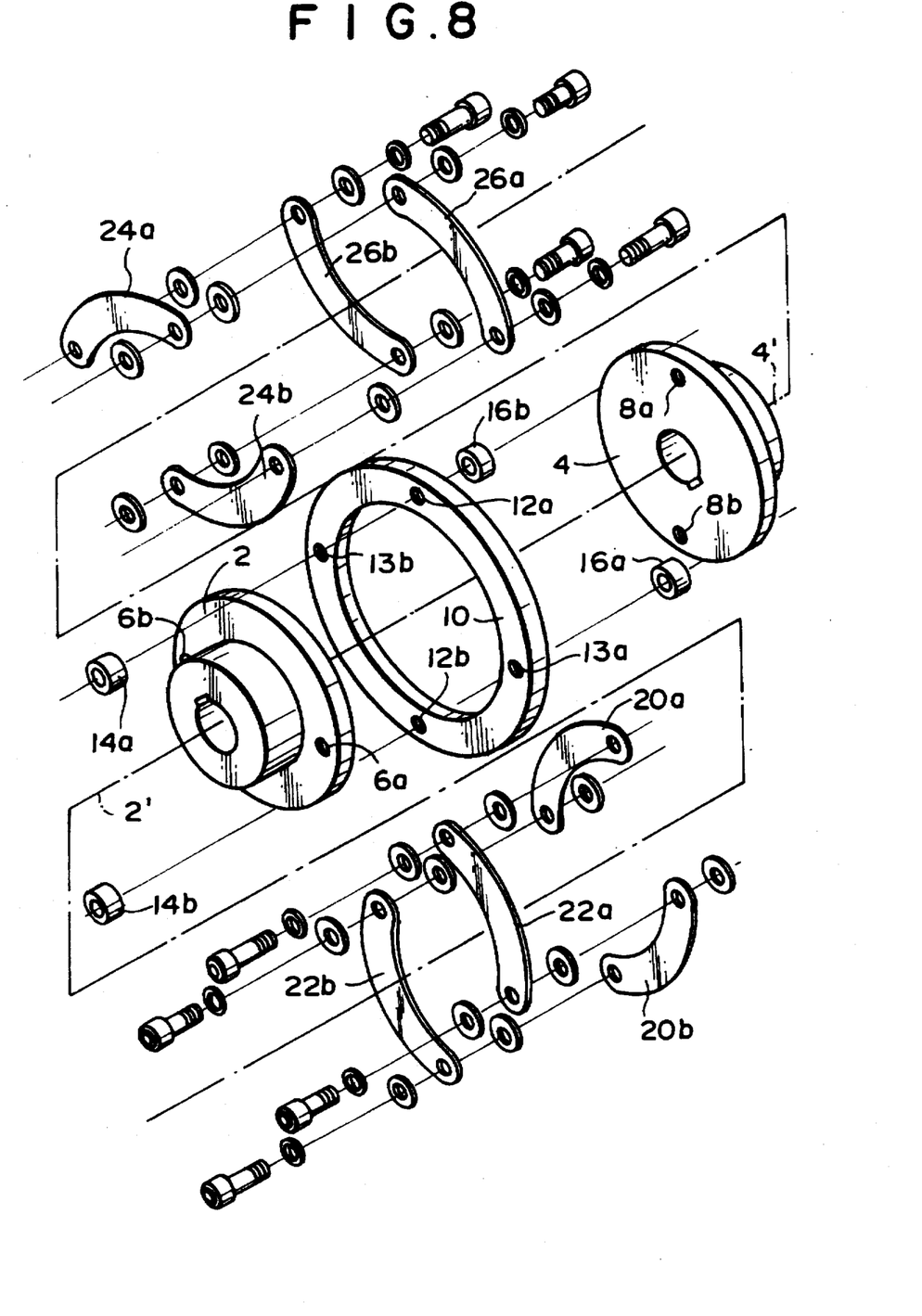
FIG. 8 is an exploded perspective view illustrating a fourth embodiment of the shaft coupling according to the present invention.
Figure 9:
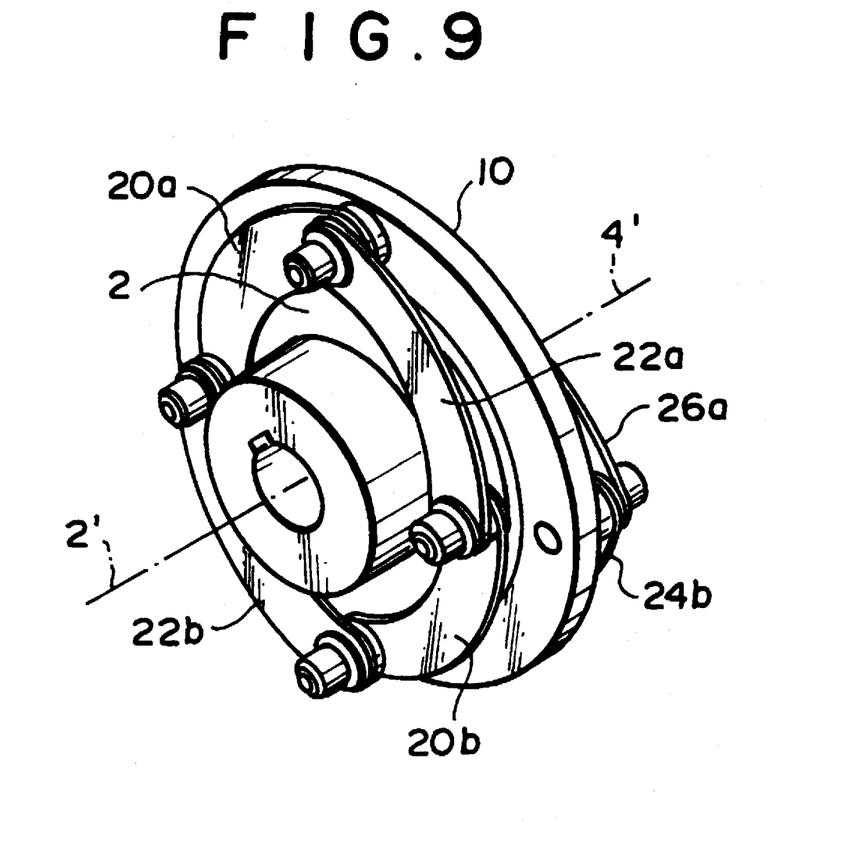
FIG. 9 is a perspective view of the shaft coupling of FIG. 8 which is in the assembled condition.

FIG. 8 is an exploded perspective view illustrating a fourth embodiment of the shaft coupling according to the present invention, and FIG. 9 is a perspective view of the same which is in the assembled condition. In these figures, like signs are each assigned to the members or portions having a like functions as in FIGS. 4 through 7.

This embodiment differs from the foregoing embodiment in that the relay member 10 is a major ring disposed radially outwardly of the driving side flange portion 2 and the driven side flange portion 4, and lacks the axial hole portion of the flange portion as in the foregoing embodiment, and the configuration in which the driving side leaf spring members 20a, 20b, 22a, 22b are arranged and the configuration in which the driven side leaf spring members 24a, 24b, 26a, 26b are arranged are each of substantially elliptical form.

Also in this embodiment, a similar effect as in the second embodiment can be obtained. Further, in this embodiment, since the relay member 10 is positioned not between the driving side flange portion 2 and the driven side flange portion, but radially outwardly, the interval between the driving side flange portion 2 and the driven side flange portion 4 can be shortened, and the axial length of the coupling is shortened.

Figure 10:
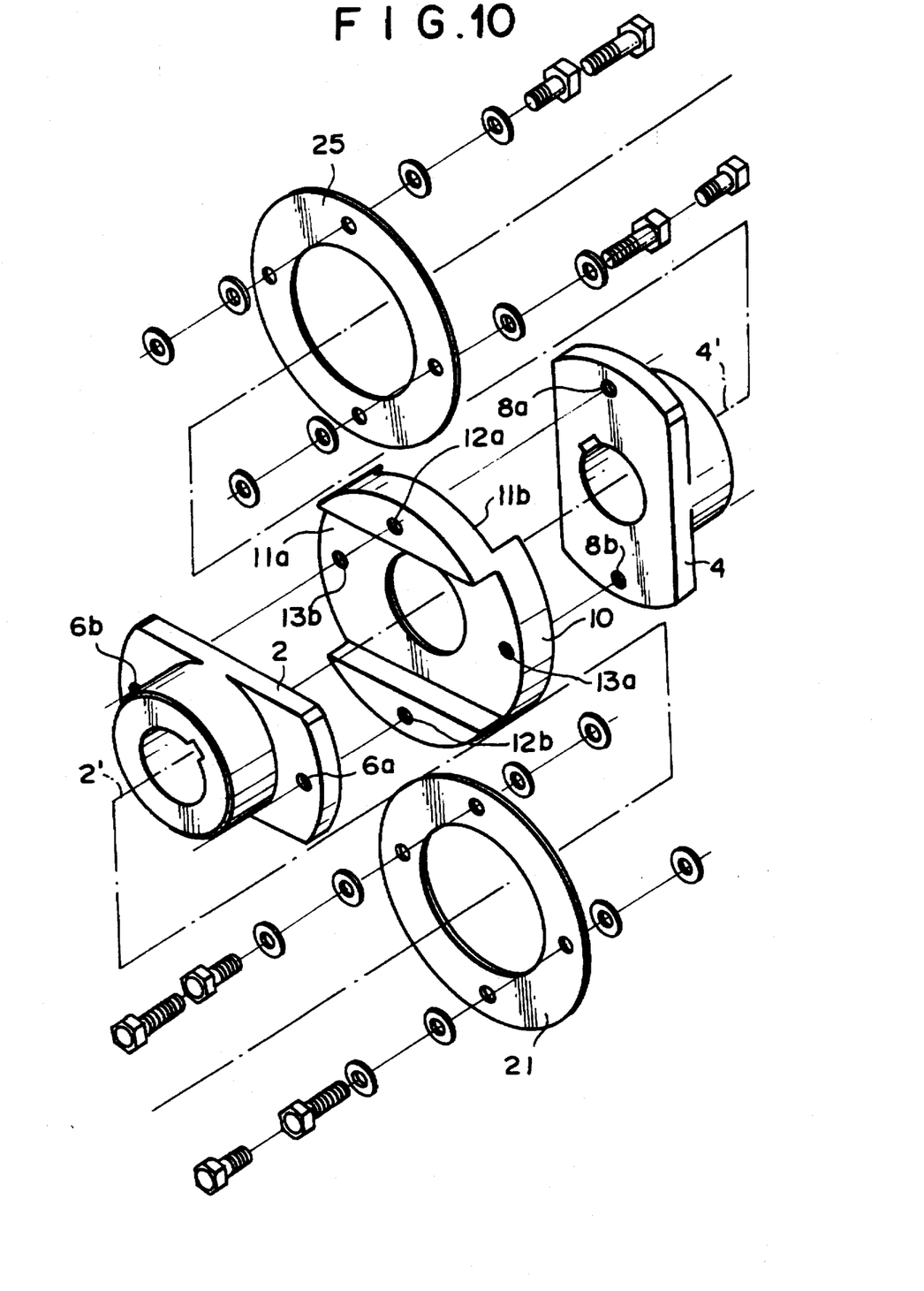
FIG. 10 is an exploded perspective view illustrating a fifth embodiment of the shaft coupling according to the present invention.
Figure 11:
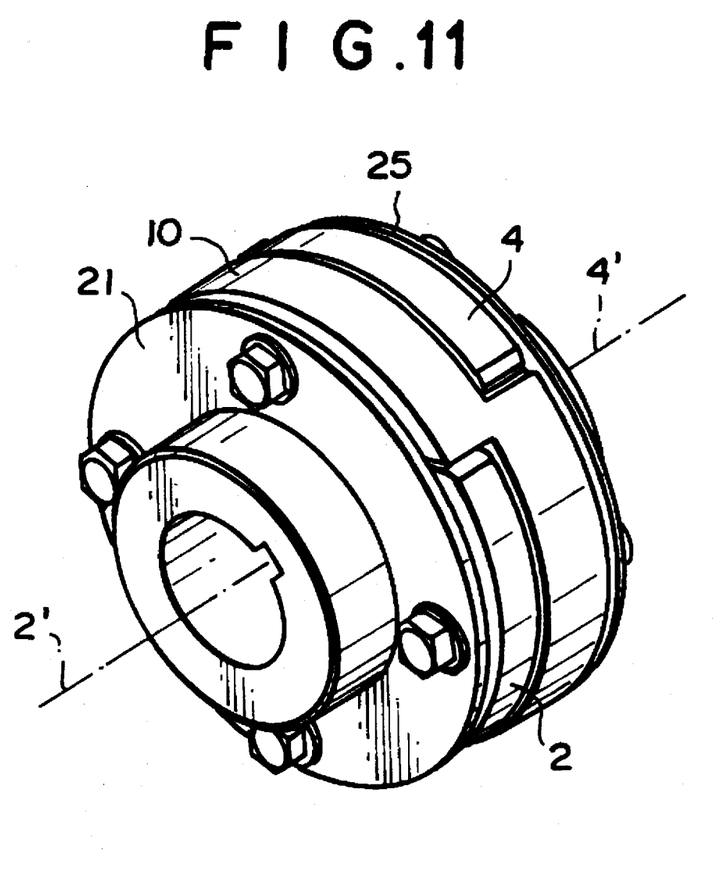
FIG. 11 is a perspective view of the shaft coupling of FIG. 10 which is in the assembled condition.

FIG. 10 is an exploded perspective view illustrating a fifth embodiment of the shaft coupling according to the present invention, and FIG. 11 is a perspective view of the same which is in the assembled condition. In these figures, like signs are each assigned to the members and the portions having a like function as in FIGS. 4 through 9.

In this embodiment, as the driving side spring member 21 and the driven side spring member 25, ones each comprising a single ring-shaped piece is used. These ring-shaped pieces each correspond to ones obtained by making the four driving side leaf spring members and the four driven side leaf spring members of the second through fourth embodiments into one. Further, the relay member 10 has a recess portion 11a for receiving the driving side flange portion 2 and a recess portion 11b for receiving the driven side flange portion 4.

Also in this embodiment, a similar effect as in the foregoing second embodiment can be obtained. Further, in the fifth embodiment, the number of the components may be small. Further, since the driving side flange portion 2 and the driven side flange portion 4 are received within the recess portions 11a, 11b of the relay member 10, the interval between the driving side flange portion 2 and the driven side flange portion 4 can be shortened with the strength of the relay member held, and the axial length of the coupling is shortened.

What is claimed is:

1. A flexible shaft coupling, comprising:
   a driving side flange portion having a first front surface and a first rear surface;
   a driven side flange portion having a second front surface and a second rear surface;
   a relay member for relaying torque from said driving side flange portion to said driven side flange portion, said relay member being disposed between said first front surface of the driving side flange portion and said second front surface of the driven side flange portion;
   four driving side leaf spring members arranged circumferentially on said first rear surface of the driving side flange portion, each of said driving side leaf spring members having a first end portion and a second end portion, wherein said first end portion of each of said driving side leaf spring members overlaps on the first end portion of one of two neighboring driving side leaf spring members and is secured to said first rear surface of the driving side flange portion, and said second end portion of each of said driving side leaf spring members overlaps on the second end portion of the other of two neighboring driving side leaf spring members and is secured to said relay member, so that said driving side leaf spring members are connected to said relay member at two first circumferential positions located opposite to each other, relative to a rotational axis of the driving side flange portion and are connected to said driving side flange portion at two second circumferential positions located opposite to each other relative to the rotational axis of the driving side flange portion, said two first circumferential positions and said two second circumferential positions being disposed evenly in circumferential direction; and four driven side leaf spring members arranged circumferentially on said second rear surface of the driven side flange portion, each of said driven side leaf spring members having a third end portion and a fourth end portion, wherein said third end portion of each of said driven side leaf spring members overlaps on the third end portion of one of two neighboring driven side leaf spring members and is secured to said second rear surface of the driven side flange portion, and said fourth end portion of each of said driven side leaf spring members overlaps on the fourth end portion of the other of two neighboring driven side leaf spring members and is secured to said relay member, so that said driven side leaf spring members are connected to said relay member at two third circumferential positions located opposite to each other relative to a rotational axis of the driven side flange portion and are connected to said driven side flange portion at two fourth circumferential positions located opposite to each other relative to the rotational axis of the driven side flange portion, said two third circumferential positions and said two fourth circumferential positions being disposed evenly in circumferential direction, said two first circumferential positions and said two third circumferential positions being disposed evenly in circumferential direction.

2. A flexible shaft coupling as set forth in claim 1, wherein said driving side flange portion has two driving side hole portions which pass through in an axial direction, through each of which driving side hole portions a driving side torque transmitting rod passes through with an allowance, one end of said driving side torque transmitting rod being connected to said second end portion, the other end of said driving side torque transmitting rod being connected to said relay member, and, said driven side flange portion has two driven side hole portions which pass through in the axial direction, through each of which driven side hole portions a driven side torque transmitting rod passes through with an allowance, one end of said driven side torque transmitting rod being connected to said fourth end portion, the other end of said driven side torque transmitting rod being connected to said relay member.

3. A flexible shaft coupling as set forth in claim 2, wherein said relay member has two first threaded holes located at said first circumferential positions and two second threaded holes located at said third circumferential positions, said driving side torque transmitting rod comprises a first cylindrical spacer and a first bolt extending through said first cylindrical spacer and being engaged with one of said first threaded holes of the relay member, and said driven side torque transmitting rod comprises a second cylindrical spacer and a second bolt extending through said second cylindrical spacer and being engaged with one of said second threaded holes of the relay member.

4. A flexible shaft coupling as set forth in claim 1, wherein said driving side flange portion has two driving side notched portions, through each of which driving side notched portions a driving side torque transmitting rod passes through with an allowance, one end of said driving side torque transmitting rod being connected to said second end portion, the other end of said driving side torque transmitting rod being connected to said relay member, and, said driven side flange portion has two driven side notched portions, through each of which driven side notched portions a driven side torque transmitting rod passes through with an allowance, one end of said driven side torque transmitting rod being connected to said fourth end portion, the other end of said driven side torque transmitting rod being connected to said relay member.

5. A flexible shaft coupling as set forth in claim 2, wherein said relay member has two first threaded holes located at said first circumferential positions and two second threaded holes located at said third circumferential positions, said driving side torque transmitting rod comprises a first cylindrical spacer and a first bolt extending through said first cylindrical spacer and being engaged with one of said first threaded holes of the relay member, and said driven side torque transmitting rod comprises a second cylindrical spacer and a second bolt extending through said second cylindrical spacer and being engaged with one of said second threaded holes of the relay member.

* * * * *